US006923932B2

United States Patent
Evans

(10) Patent No.: US 6,923,932 B2
(45) Date of Patent: Aug. 2, 2005

(54) COMPOSITE STRUCTURE TIGHTLY RADIUSED MOLDING METHOD

(75) Inventor: Gregg S. Evans, Windsor (CA)

(73) Assignee: Intertec Systems, LLC, Troy, MI (US)

( * ) Notice: Subject to any disclaimer, the term of this patent is extended or adjusted under 35 U.S.C. 154(b) by 226 days.

(21) Appl. No.: 10/318,952

(22) Filed: Dec. 12, 2002

(65) Prior Publication Data

US 2004/0113304 A1 Jun. 17, 2004

(51) Int. Cl.[7] .......................... B29C 44/06; B29C 45/14; B29C 51/10
(52) U.S. Cl. ..................... 264/415; 264/46.4; 264/46.5; 264/46.6; 264/46.8; 264/479; 264/511
(58) Field of Search ................. 264/479, 511, 264/415, 46.4, 46.5, 46.6, 46.8

(56) References Cited

U.S. PATENT DOCUMENTS

| | | | |
|---|---|---|---|
| 3,140,328 A | | 7/1964 | Simms |
| 4,102,975 A | | 7/1978 | Doerer |
| 4,308,702 A | * | 1/1982 | Rajewski ..................... 52/519 |
| 4,420,447 A | * | 12/1983 | Nakashima ................ 264/46.4 |
| 4,759,700 A | | 7/1988 | Onnenberg et al. |
| 4,810,452 A | * | 3/1989 | Taillefert et al. ............ 264/247 |
| 4,875,843 A | | 10/1989 | Onnenberg et al. |
| 4,923,539 A | | 5/1990 | Spengler et al. |
| 5,411,688 A | * | 5/1995 | Morrison et al. .......... 264/45.4 |
| 5,460,497 A | | 10/1995 | Vismara |
| 5,647,943 A | | 7/1997 | Kozlowski |
| 5,776,509 A | * | 7/1998 | Ota et al. .................... 425/111 |
| 5,776,510 A | | 7/1998 | Reichental et al. |
| 5,783,016 A | | 7/1998 | Gallagher et al. |
| 5,811,053 A | | 9/1998 | Ota et al. |
| 5,816,488 A | * | 10/1998 | Moeder ...................... 229/406 |
| 5,919,324 A | | 7/1999 | Moffitt et al. |
| 6,361,723 B1 | | 3/2002 | Sulzbach et al. |

* cited by examiner

Primary Examiner—Allan R. Kuhns
(74) Attorney, Agent, or Firm—Dykema Gossett PLLC

(57) ABSTRACT

A method of molding a composite structure of a polymeric preformed skin with tightly radiused features and a polymeric foam body is provided. The method includes providing a mold cavity having a first edge; placing the preformed skin in the mold cavity with a preformed first edge of the preformed skin adjacent to the first edge of the mold cavity; heating the preformed skin adjacent the first edge; exposing the first edge to a vacuum to reform the preformed skin first edge to be adjacent the mold cavity first edge and injecting a foam polymeric material into the mold.

31 Claims, 2 Drawing Sheets

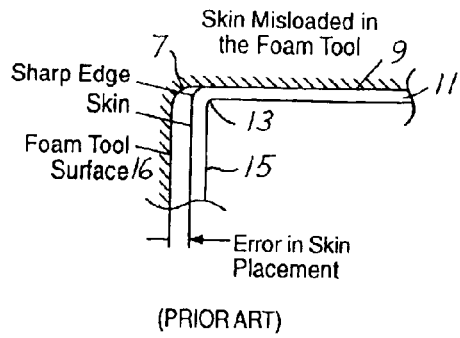
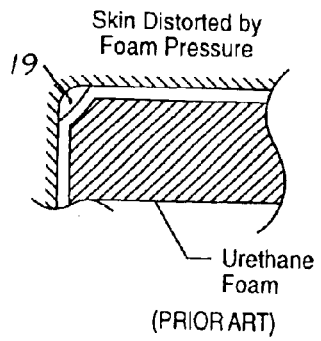
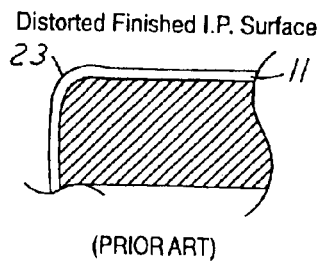
FIG. 1A (PRIOR ART)
FIG. 1B (PRIOR ART)
FIG. 1C (PRIOR ART)
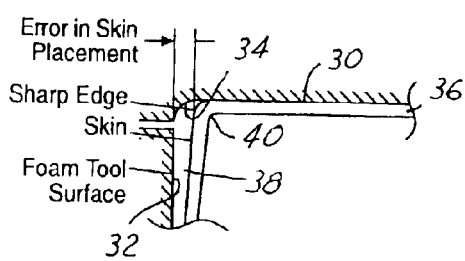
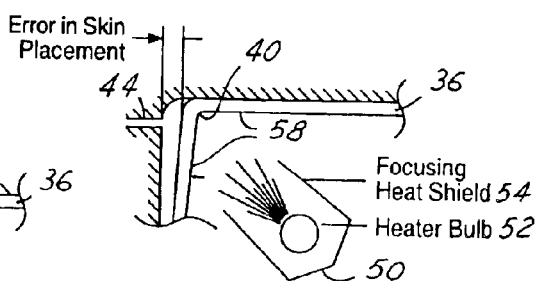
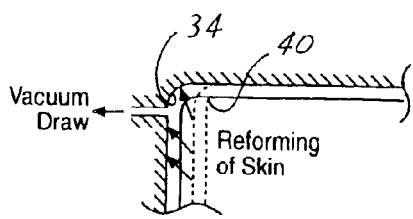
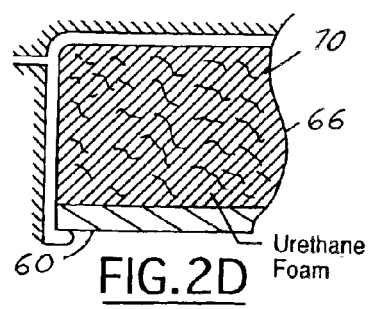
FIG. 2A
FIG. 2B
FIG. 2C
FIG. 2D

COMPOSITE STRUCTURE TIGHTLY RADIUSED MOLDING METHOD

FIELD OF THE INVENTION

The field of the present invention is a method for molding a composite structure. More particularly, the present invention relates to methods of molding a composite structure having a polymeric preformed skin connected to a rigid substructure and having a foam polymeric material juxtaposed there between.

BACKGROUND OF THE INVENTION

In the past, many automotive instrument panels were fabricated from a metal stamping which was polished and then painted. In an effort to improve vehicle occupant safety in crash situations, padding was added to the side of the dashboard that faced towards the vehicle's interior. To lower manufacturing costs and also to lower vehicular weight, padded metal dashboards were replaced with composite dashboards.

Composite instrument panels have a preformed structural member. The structural member is typically fabricated from a rigid plastic material or a wood fiber compound. A foam polymeric material covers the preform to provide for cushioning. Placed on top of the foam polymeric material is a preformed polymeric multiform skin membrane, which typically has an outer surface to simulate a textured appearance similar to leather. To fabricate such a composite dashboard, typically the skin membrane is placed into a mold spaced away from the rigid preformed structural member. The material that provides the foam cushioning is then injected into the mold and adheres to both the preformed structure and preformed skin membrane to form a composite instrument panel.

Prior to its placement into the mold to form the composite, the skin membrane is formed in a separate molding operation. To form the skin membrane, a grained plastic sheet is heated and vacuum formed over a male mold. The formed skin is then removed and trimmed to size.

As previously stated, the preformed polymeric skin is placed within a mold cavity. Prior to the present invention, as best shown in FIGS. 1A–1C, the foam tool 9 (also referred to as the mold half) which forms the mold cavity was provided. The foam tool 9 is formed in the shape of a sharp edge 7 to provide for the instrument panel. In a similar fashion the preformed skin 11 has a sharp edge 13. Often there is a slight error, typically less than 1.5 mm. in the placement of a side surface 15 from the foam tool surface 16 of the foam tool 9. Although shown in FIG. 1A in a two-dimensional diagram, it is apparent to those skilled in the art that this mismatch can have three-dimensional characteristics in that the edge 13 can project in all three axes.

Referring to FIG. 1B when the urethane foam is injected into the mold cavity, a gap 19 can form between the foam tool surface 16 and the skin 11. In other situations, the skin 11 will not shrink the anticipated amount prior to placement within the mold cavity. Accordingly, the sharp edge 13 of the skin will not properly align with the sharp edge 7 of the foam tool. The injection pressure of the urethane foam will result in a distorted surface 23 on the finished instrument panel (FIG. 1C).

In particular, tight edges or features are prone to the aforementioned distortion. These tight edges can affect fit and appearance between the instrument panel and trim panels of the vehicle and can also affect alignment with the side window defrosters and the air conditioning registers and other parts of the instrument panel. Typically, when such failure occurs, the whole instrument panel must be scrapped. Or, to prevent the occurrence of such distortions, flexibility in the design of the instrument panel is restricted.

SUMMARY OF THE INVENTION

To alleviate the above noted concern, a revelation of the present invention is brought forth. In the preferred embodiment the present invention provides a method of molding composite structures such as instrument panels. A foam tool is provided having a vacuum line adjacent to the sharp edge feature of the foam tool. Small holes are drilled in the foam tool to the vacuum line to communicate the vacuum to the foam tool surface. The preformed polymeric skin is placed within the mold cavity of the mold tool. The skin is subjected to a vacuum which aids in holding the skin during its heating within the foam tool. This vacuum is at a first level which is insufficient to stretch the skin even when heated.

A focused heat source is utilized to heat the skin preferably to its forming temperature. The heat is focused in a band of the skin which is adjacent to the sharp edge of the skin. The remaining portions of the skin are unheated. The vacuum level is then increased to a second level which now reforms the skin's sharp edge in the correct position. As a result of the focused heating and the vacuum application, the sharp edges of the skin and of the foam tool are now matched by local reforming. Thereafter urethane or other foam polymeric materials are injected into the mold, resulting in a material decrease in misalignment in the edges between the skin and the mold. The molding method of the present invention brings forth instrument panels having edges which are more geometrically compliant with the tight design intent fit configuration of the instrument panel.

Other features of the present invention will be more apparent to those skilled in the art from a review of the invention as it is further explained in the accompanying drawings and detailed description.

BRIEF DESCRIPTION OF THE DRAWINGS

FIG. 1A is a schematic view of a prior art method of molding an instrument panel illustrating an error of placement of the instrument panel skin within a mold cavity.

FIG. 1B is a prior art schematic view illustrating a discontinuity formed within the mold cavity upon injection of a urethane foam within the skin.

FIG. 1C is a prior art partial schematic view illustrating a distorted surface formed in the instrument panel.

FIG. 2A is a schematic view similar to that of FIG. 1A illustrating placement of the skin in the mold cavity utilizing the method of the present invention.

FIG. 2B is a schematic view showing focused heat being applied to the area of the skin adjacent to the edge of the skin according to the method of the present invention.

FIG. 2C is a schematic view illustrating the reforming of the skin's edge within the mold cavity with the high vacuum applied.

FIG. 2D is a schematic view of the instrument panel formed by the present invention with its improved surface finish.

DETAILED DESCRIPTION OF THE INVENTION

Figure 3:
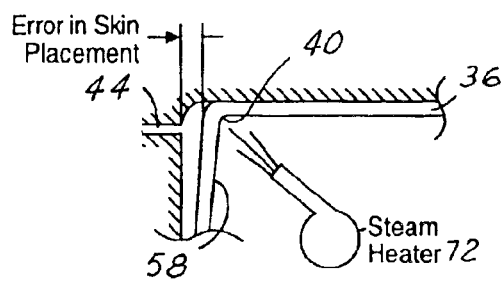
FIGS. 3 and 4 are schematic views of alternate preferred methods of heating the skin utilizing a hot air blower or steam.

Referring to FIG. 2A, the present inventive composite molding method utilizes a mold half 30. Mold half 30 has a tool surface 32 and a sharp edge 34. A male or female preformed polymeric skin 36 is provided. The skin 36 will typically have a maximum thickness between 1 and 1.5 mm. And preferably will be less than 1.1 mm. The skin 36 will preferably have a thickness greater than 0.2 mm. Typical materials for the skin are thermo plastic olefin (TPO) and polyvinyl chloride (PVC).

To begin the molding process, the skin is placed within the mold cavity 38 formed by the mold half 30. The sharp edge 40 of the skin 36 is placed closely adjacent as possible to the sharp edge 34 of the mold half 30. The skin 36 should be preformed in a method which produces the deepest grain level possible to compensate for additional stretch during the molding operation. It is usually preferable that the mold half 30 at least in the vicinity of the sharp edge 34 be thermally insulated to the maximum extent practically possible. The skin 36 is exposed to a vacuum level of approximately 8 inches Hg upon its loading into the mold half 30. This vacuum level should be limited such that it is not capable of stretching/bending the skin even close to the forming temperature condition.

Referring to FIG. 2B, a heat source 50 is provided. The heat source is a radiant heater having a heater bulb 52 and a focusing heat shield 54. The heater 50 will heat the skin 36 in an area encompassed by band 58. In most instances band 58 which is adjacent to the edge 40 of the skin 36 will be 10–80 mm. in width. The focused heater will bring the temperature of the skin to its forming temperature which is between 250° to 300° Fahrenheit for TPO skins, and 320° to 360° Fahrenheit for PVC skins.

As the skin 36 reaches a forming temperature, the vacuum line 44 will induce a second higher level vacuum, typically 18 inches Hg or lower, to now reform the skin (FIG. 2C) so that the edge 40 will be more closely adjacent, aligned and matched with the edge 34 of the mold half. Upon the reforming of the skin 36, the mold will close and urethane foam or other foam polymeric material 66 will be injected (FIG. 2D). Prior to the mold closing, the preformed generally rigid structure 60 is placed on the mold lid. After appropriate cure time, the composite instrument panel 70 is removed from the mold with the foam cushion material adhering to both the rigid structure 60 and the skin 36.

Referring back to FIG. 2B, it is important that the heat of the skin be focused along the edge 40 so that there is not enough heating of the total skin area to significantly accelerate the blowing of the urethane material as it is injected into the mold cavity. A generalized heating of the entire skin will accelerate the blowing, which will lower foam density of the polyurethane.

Figure 4:
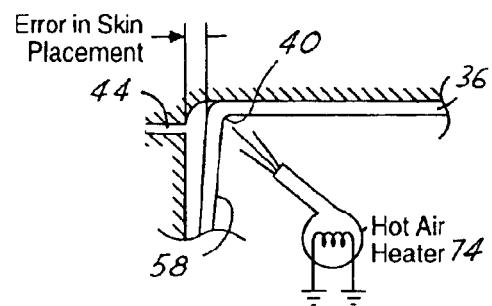

Referring to FIGS. 3 and 4, the present invention is shown having a steam heater 72 or an alternative hot air blower type heater 74.

The fit between the sharp skin edges and the trim components is critical to many cushion customers. With utilization of the present invention, the skin edge/mold edge fit condition is improved from a range of 0–1.5 mm. to a typical range of 0–0.5 mm.

Various embodiments of the present invention have been explained. However, it will be apparent to those skilled in the art, of the various changes and modifications to the present inventive method which can be made without departing from the spirit or scope of the present invention as it is further encompassed by the following claims.

What is claimed is:

1. A method of molding a composite structure having a first edge, said composite structure including a polymeric preformed skin and a polymeric foam body covered by said skin, said method comprising:
    providing a mold cavity having a first edge;
    placing said preformed skin in said mold cavity with a preformed first edge of said preformed skin adjacent to said first edge of said mold cavity;
    focus heating said preformed skin adjacent said preformed skin first edge;
    exposing said first edge to a vacuum to urge said preformed skin first edge to be adjacent said mold cavity first edge; and
    injecting a foam polymeric material into said mold.

2. A method as described in claim 1, wherein hot air is utilized to heat said preformed skin adjacent said preformed skin first edge.

3. A method as described in claim 1, wherein a radiant heat source is utilized to heat said preformed skin adjacent said preformed skin first edge.

4. A method as described in claim 1, wherein steam is utilized to heat said preformed skin adjacent said preformed skin first edge.

5. A method as described in claim 1, wherein heat is applied within a 10–80 mm. wide band of said preformed skin first edge.

6. A method as described in claim 1, wherein a first vacuum level is applied to said preformed skin during placement in said mold cavity and a second vacuum level is applied to said preformed skin after said preformed skin first edge has been heated.

7. A method as described in claim 6, wherein said second vacuum level is higher than said first vacuum level.

8. A method as described in claim 7, wherein said first level of vacuum is less than an amount of vacuum required to stretch said skin before said skin reaches a forming temperature as a result of being heated.

9. A method as described in claim 1, wherein said preformed skin has a thickness less than 1.1 mm.

10. A method as described in claim 1, wherein said preformed skin is male formed.

11. A method as described in claim 1, wherein said preformed skin is female formed.

12. A method of molding a composite structure having a first edge, said composite structure including a generally rigid structure, a polymeric preformed skin covering said rigid structure, a foamed polymeric cushioning material juxtaposed between said preformed skin and said rigid structure, said method comprising:
    providing a mold cavity having a first edge;
    placing said preformed skin in said mold cavity with a preformed first edge of said preformed skin adjacent to said first edge of said mold cavity;
    focus heating said preformed skins first edge;
    exposing said preformed skin first edge to a vacuum to urge said preformed skin first edge to reform to match said mold cavity first edge;
    placing said rigid structure within said mold cavity at least partially spaced away from said preformed skin; and
    injecting said mold cavity with a foam polymeric material so as to be juxtaposed between said rigid structure and said preformed skin.

13. A method as described in claim 12, wherein hot air is utilized to heat said preformed skin adjacent said preformed skin first edge.

14. A method as described in claim 12, wherein a radiant heat source is utilized to heat said preformed skin adjacent said preformed skin first edge.

15. A method as described in claim 12, wherein steam is utilized to heat said preformed skin adjacent said preformed skin first edge.

16. A method as described in claim 12, wherein heat is applied within a 10–80 mm. wide band of said preformed skin first edge.

17. A method as described in claim 12, wherein a first vacuum level is applied to said preformed skin during placement of said preformed skin in said mold cavity and a second vacuum level is applied to said preformed skin after said preformed skin first edge has been heated.

18. A method as described in claim 17, wherein said second vacuum level is higher than said first vacuum level.

19. A method as described in claim 17, wherein said first level of vacuum is less than an amount of vacuum required to stretch/bend said skin before said skin reaches a forming temperature as a result of being heated.

20. A method as described in claim 1, wherein said preformed skin has a thickness less than 1.1 mm and greater than 0.2 mm.

21. A method of molding a composite automotive instrument panel having a first edge, said composite automotive instrument panel including a generally rigid structure, a polymeric preformed skin covering said rigid structure, a foamed polymeric cushioning material juxtaposed between said preformed skin and said rigid structure, said method comprising:
 providing a mold cavity having a first edge;
 placing said preformed skin in said mold cavity with a preformed first edge of said preformed skin adjacent to said first edge of said mold cavity;
 focus heating said preformed skin adjacent to and including said first edge;
 exposing said first edge to a vacuum to urge said preformed skin first edge to be reformed to match said mold cavity first edge;
 placing said rigid structure within said mold cavity at least partially spaced away from said preformed skin; and
 injecting said mold cavity with a polymeric foamed material so as to be juxtaposed between said rigid structure and said preformed skin.

22. A method of molding a composite structure having a first edge, said composite structure including a polymeric preformed skin and a polymeric foam body covered by said skin, said method comprising:
 providing a mold cavity having a first edge;
 placing said preformed skin in said mold cavity with a preformed first edge of said preformed skin adjacent to said first edge of said mold cavity;
 heating said preformed skin adjacent said preformed skin first edge;
 exposing said first edge to a vacuum to urge said preformed skin first edge to be adjacent said mold cavity first edge, said vacuum being at a first level during placement of said preformed skin in said mold cavity and a second vacuum level after said preformed skin has been heated; and
 injecting a foam polymeric material into said mold.

23. A method as described in claim 22, wherein heat is applied within a 10–80 mm. wide band of said preformed skin first edge.

24. A method as described in claim 22, wherein said second vacuum level is higher than said first vacuum level.

25. A method as described in claim 24, wherein said first level of vacuum is less than an amount of vacuum required to stretch said skin before said skin reaches a forming temperature as a result of being heated.

26. A method as described in claim 22, wherein said preformed skin has a thickness less than 1.1 mm.

27. A method as described in claim 22, wherein said preformed skin is male formed.

28. A method as described in claim 22, wherein said preformed skin is female formed.

29. A method of molding a composite structure having a first edge, said composite structure including a generally rigid structure, a polymeric preformed skin covering said rigid structure, a foamed polymeric cushioning material juxtaposed between said preformed skin and said rigid structure, said method comprising:
 providing a mold cavity having a first edge;
 placing said preformed skin in said mold cavity with a preformed first edge of said preformed skin adjacent to said first edge of said mold cavity;
 heating said preformed skins first edge;
 exposing said preformed skin first edge to a vacuum to urge said preformed skin first edge to reform to match said mold cavity first edge, said vacuum being at a first level during placement of said preformed skin in said mold cavity and a second vacuum level after said preformed skin has been heated;
 placing said rigid structure within said mold cavity at least partially spaced away from said preformed skin; and
 injecting said mold cavity with a foam polymeric material so as to be juxtaposed between said rigid structure and said preformed skin.

30. A method as described in claim 22, wherein said preformed skin has a thickness less than 1.1 mm and greater than 0.2 mm.

31. A method of molding a composite automotive instrument panel having a first edge, said composite automotive instrument panel including a generally rigid structure, a polymeric preformed skin covering said rigid structure, a foamed polymeric cushioning material juxtaposed between said preformed skin and said rigid structure, said method comprising:
 providing a mold cavity having a first edge;
 placing said preformed skin in said mold cavity with a preformed first edge of said preformed skin adjacent to said first edge of said mold cavity;
 heating said preformed skin adjacent to and including said first edge;
 exposing said first edge to a vacuum to urge said preformed skin first edge to be reformed to match said mold cavity first edge, said vacuum being at a first level during placement of said preformed skin in said mold cavity and a second vacuum level after said preformed skin has been heated;
 placing said rigid structure within said mold cavity at least partially spaced away from said preformed skin; and
 injecting said mold cavity with a polymeric foamed material so as to be juxtaposed between said rigid structure and said preformed skin.

* * * * *